United States Patent [19]
Matsubara et al.

[11] Patent Number: 5,231,340
[45] Date of Patent: Jul. 27, 1993

[54] SERVOMOTOR CONTROL METHOD

[75] Inventors: Shunsuke Matsubara; Kaname Matsumoto, both of Yamanashi, Japan

[73] Assignee: Fanuc Ltd., Japan

[21] Appl. No.: 449,920

[22] PCT Filed: Apr. 4, 1989

[86] PCT No.: PCT/JP89/00355
§ 371 Date: Dec. 14, 1989
§ 102(e) Date: Dec. 14, 1989

[87] PCT Pub. No.: WO89/10590
PCT Pub. Date: Nov. 2, 1989

[30] Foreign Application Priority Data

Apr. 20, 1988 [JP] Japan ................. 63-095776

[51] Int. Cl.⁵ .............................................. G05B 19/10
[52] U.S. Cl. ..................................... 318/567; 318/564; 318/563; 318/603; 318/660; 318/661; 318/602
[58] Field of Search ............. 318/567, 569, 563, 603, 318/660, 661, 602; 340/825.23; 364/474.19

[56] References Cited

U.S. PATENT DOCUMENTS

| | | | |
|---|---|---|---|
| 4,107,654 | 8/1978 | Nihijima | 318/569 X |
| 4,484,287 | 11/1984 | Game et al. | 318/563 X |
| 4,575,666 | 3/1986 | Nakahima et al. | 318/602 X |

Primary Examiner—William M. Shoop, Jr.
Assistant Examiner—Karen Masih
Attorney, Agent, or Firm—Staas & Halsey

[57] ABSTRACT

An improved servomotor control method where a multiplier ratio DMR is computed in advance by an arithmetic unit (20) from a traveling distance L of a movable machine element per revolution of a servomotor, a traveling distance R per pulse of a move command, and a number N of incremental pulses generated by an absolute position-detecting pulse coder (18) per revolution of the servomotor. A move command ($\Delta R_n$) is accumulated by a move command accumulator (11), an absolute position ($P_A'$) output by the absolute position-detecting pulse coder (18) is multiplied by the multiplier ratio DMR. A difference ($E_r$) between a value ($P_c$) obtained by accumulating the move commands and the result ($P_A$) of the multiplication operation is computed as a position error, and rotation of the servomotor (17) is controlled by using the position error.

10 Claims, 3 Drawing Sheets

SERVOMOTOR CONTROL METHOD

BACKGROUND OF THE INVENTION a. Field of the Invention

This invention relates to a servomotor control method and, more particularly, to a servomotor control method using a pulse coder which detects absolute position.

b. Description of the Related Art

In digital servomotor control for digitally controlling a servomotor, a traveling distance $\Delta R_n$ along each axis is computed every predetermined time $\Delta T$ by a numerical controller and fed into a digital servo-circuit. The digital servo-circuit performs an arithmetic operation in accordance with the following equation every $\Delta T$:

$$E_r + \Delta R_n - \Delta P_n \rightarrow E_r$$

(where $\Delta P_n$ is the actual distance traveled every $\Delta T$, and $E_r$ represents position error) to execute pulse width modulation in dependence upon the size of the position error, thereby controlling the rotation of the servomotor.

FIG. 3 is a block diagram of such a conventional digital servo-circuit, which includes an arithmetic unit 1 for computing the difference every predetermined time $\Delta T$ between a move command $\Delta R_n$ and the actual distance traveled $\Delta P_n$, an error counter 2 for accumulating the output ($\Delta R_n - \Delta P_n$) of the arithmetic unit 1 in accordance with the equation $$E_r + (\Delta R_n - \Delta P_n) \rightarrow E_r$$

a setting unit 3 for setting position gain $K_p$, a velocity controller 4, a current controller 5, a hardware unit 6, such as a servoamplifier and servomotor, a pulse coder 7 for generating N-number of pulses per revolution of the servomotor, an integrator 8 for counting up the pulses generated by the pulse coder 7 every $\Delta T$ and outputting a value M of the count, and a DMR multiplying unit 9 for multiplying the output M of the integrator 8 by a detection multiplier ratio DMR and outputting the distance $\Delta P_n$ traveled in the time $\Delta T$, with the units of $\Delta P_n$ being the same as the set units of the move command $\Delta R_n$.

The detection multiplier ratio DMR is a value obtained, in accordance with the following equation, from a traveling distance L of a movable machine element per revolution of the servomotor, a traveling distance (set units) R per pulse of the move command, and a number of pulses N (pulse/rev) output by the pulse coder 7 per revolution of the servomotor:

$$DMR = L/(R \cdot N)$$

Accordingly, if the set units R of the move command are 0.1 $\mu$m/pulse, the traveling distance L of the movable machine element per motor revolution is 8 mm and the number N of pulses generated by the pulse coder per motor revolution is 2000 pulses/rev, then DMR=4 will be obtained from the foregoing equation and the units of the actual distance traveled $\Delta P_n$ input to the arithmetic unit 1 will be (0.1 $\mu$m/pulse), which is the same as the set units of the move command.

With the conventional method, only a special integer can be used as the value of the DMR. Consequently, a plurality of different pulses coders, each of which outputs a different number of pulses in revolution, are prepared in advance and a pulse coder is selected to construct the servo-system in such a manner that the DMR obtained from the foregoing equation can be made the special integer. With this approach, however, a large number of pulse coders must be prepared in advance. Moreover, because of the relation involving R, cases arise in which the DMR will not become the integer regardless of which of the prepared pulse coders is used.

When a value other than an integer is used as the DMR, a numerical value arises following the decimal point in the results of the multiplication operation in the DMR multiplying unit. This value following the decimal point accumulates as an error every $\Delta T$, thereby lowering the precision of servomotor control. Accordingly, a numerical value other than an integer cannot be employed as the DMR.

An object of the present invention is to provide a servomotor control method in which any numerical value, even one including a decimal point, may serve as the DMR, and in which it is unnecessary to prepare a variety of pulse coders.

SUMMARY OF THE INVENTION

In order to solve the foregoing problems, the present invention computes the multiplier ratio DMR from (i) a traveling distance L of a movable machine element per revolution of a servomotor, (ii) a traveling distance R per pulse of a move command, and (iii) a number N of incremental pulses generated by an absolute position-detecting pulse coder per revolution of the motor. In performing servomotor control, the present invention accumulates move commands, multiplies, by DMR, the absolute position output by the absolute position-detecting pulse coder, computes, as a position error, a difference between a value obtained by accumulating the move commands and the result of the multiplication operation, and controls rotation of the servomotor by using the position error.

Thus, as set forth above, the present invention is such that the absolute position is multiplied by the DMR. Therefore, even if the detection multiplier ratio DMR has a value following a decimal point, there will be no accumulation of error, as occurs in the prior art.

DESCRIPTION OF THE PREFERRED EMBODIMENT

Figure 1:
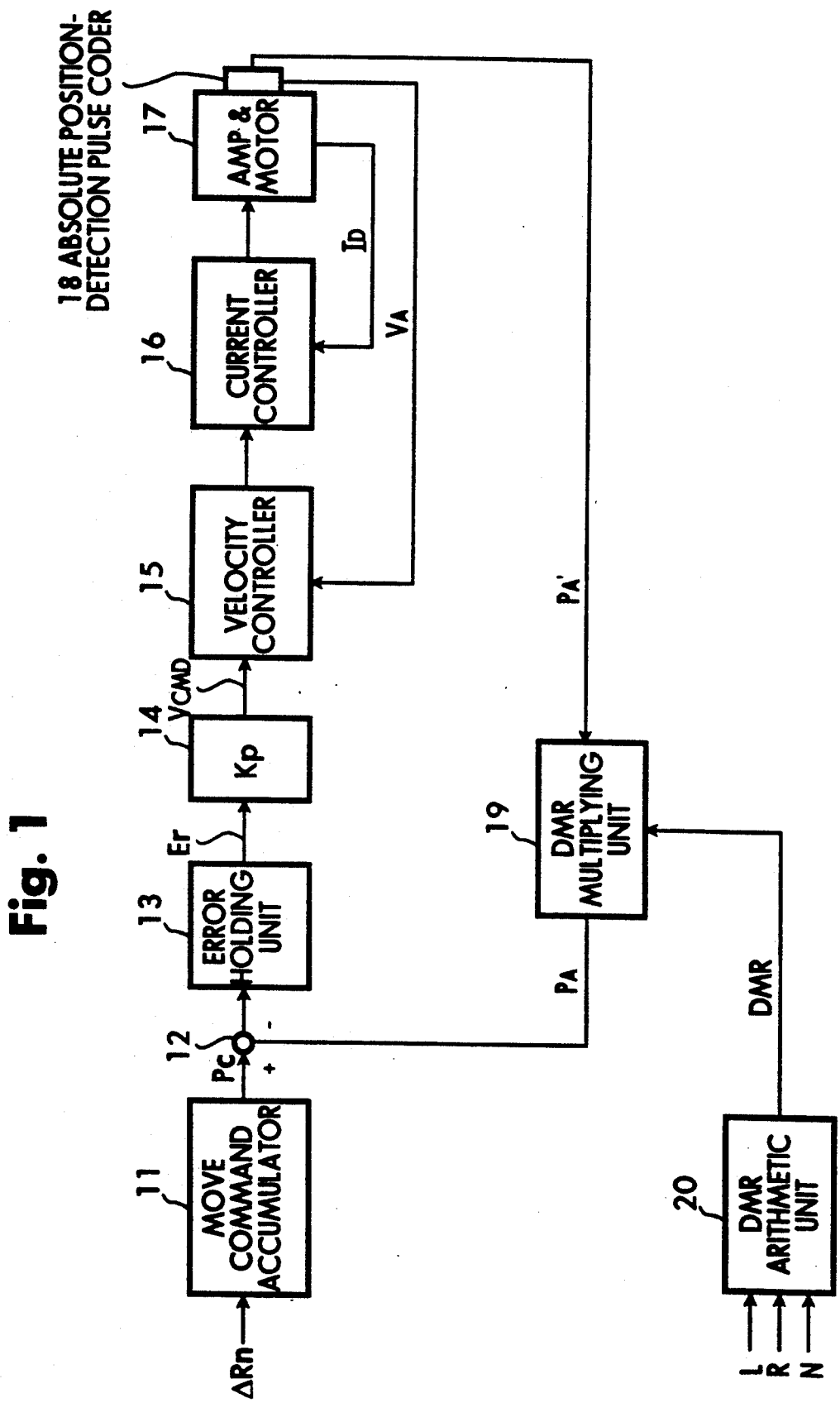
FIG. 1 is a block diagram of a servomotor control system according to the present invention.
Figure 2:
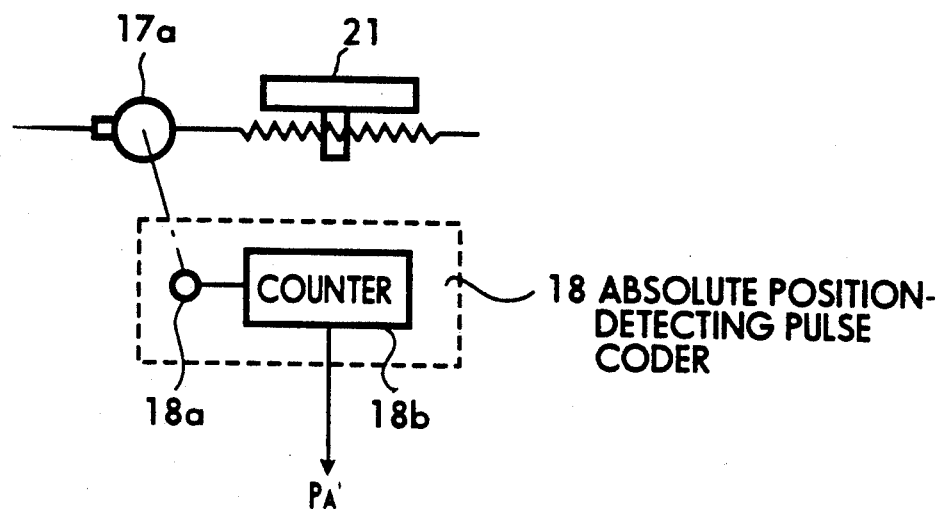
FIG. 2(a) is a diagram describing a pulse coder which detects absolute position.
FIG. 2(b) is a detailed diagram showing the construction of a counter.
Figure 2:
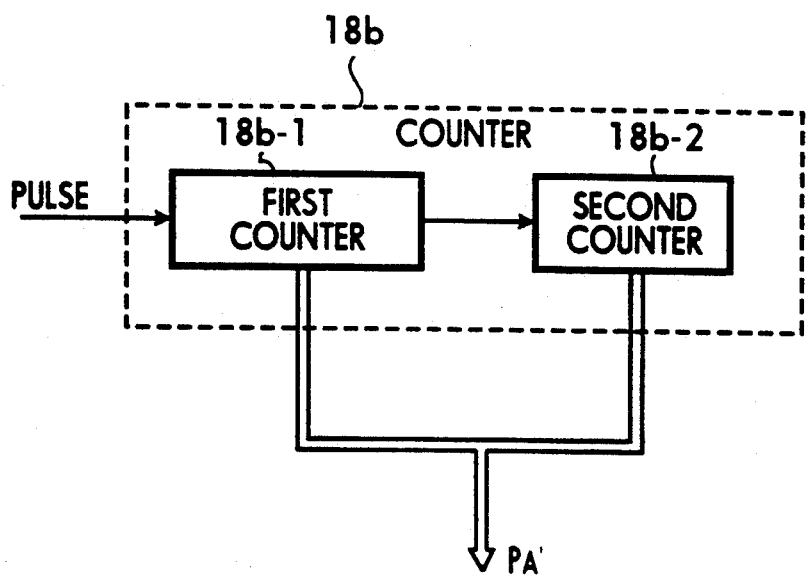
Figure 3:
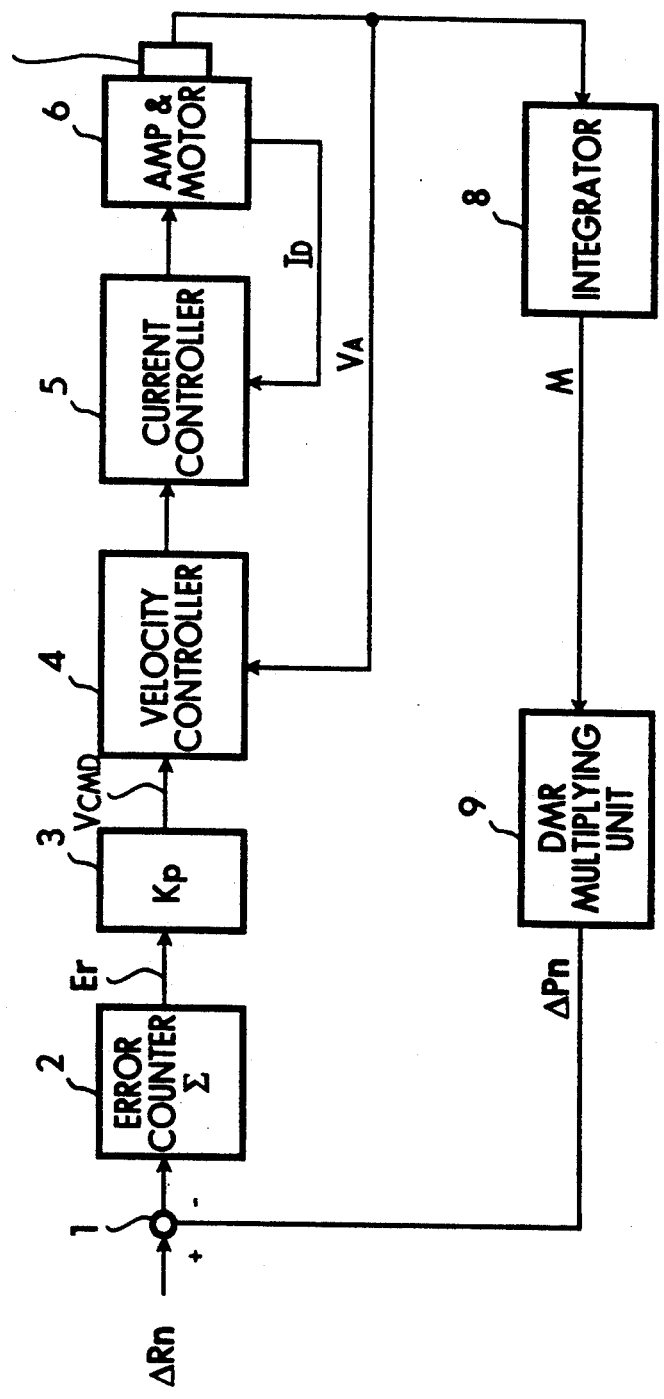
FIG. 3 is a block diagram for describing the prior-art method.

FIG. 1 is a block diagram of a servomotor control apparatus according to the present invention, and FIGS. 2(a) and 2(b) are values for describing a pulse coder which detects absolute position.

Numeral 11 denotes a move command accumulating unit for adding up the move command $\Delta R_n$ every predetermined time $\Delta T$ and outputting the accumulated value $P_c$ of the move commands, 12 denotes a position error arithmetic unit for computing a position error, which is the difference between the accumulated value $P_c$ of the move commands and the actual absolute position $P_A$ of the movable machine element, 13 denotes an error holding unit for storing the position error, 14 denotes a setting unit for setting position gain $K_p$, 15 denotes a velocity controller, 16 denotes a current controller, 17 denotes a hardware unit such as a servoamplifier and servomotor, and 18 denotes a pulse coder for detecting absolute position.

As shown in FIG. 2(a), the pulse coder 18 for detecting absolute position is composed of a pulse coder 18a which generates one incremental pulse whenever a motor 17a rotates through a predetermined angle, and a counter 18b for counting pulses, which are generated by the pulse coder 18a, in dependence upon the direction of rotation, thereby to store and output absolute position $P_A'$, which comprises the absolute position within one revolution of the servomotor and the number of revolutions of the servomotor. The counter 18b continues storing the absolute position $P_A'$ even if the power supply is cut off. Numeral 21 in FIG. 2(a) denotes the movable machine element. The pulse coder 18a generates N-number of incremental pulses per revolution of the motor.

As shown in FIG. 2(b), the counter 18b is constituted by a first counter 18b-1 of capacity N for counting up/down the incremental pulses in conformity with the direction of rotation, and a second counter 18b-2 for counting up overflow pulses and counting down underflow pulses from the first counter, thereby storing the number of revolutions of the servomotor.

Numeral 19 denotes a DMR multiplying unit for multiplying the absolute position (number of pulses) $P_A'$ outputted by the counter 18b of the absolute position-detecting pulse coder 18 by the DMR, the result being output in units the same as the set units of the move command. Numeral 20 denotes a DMR arithmetic unit for computing the detection multiplier ratio DMR in accordance with the equation $$DMR = L/(R \cdot N) \qquad (1)$$

from the traveling distance L of the movable machine element per revolution of the motor, the traveling distance R (set units) per pulse of a move command, and the number N (pulse/rev) of incremental pulses output by the pulse coder 18a per revolution of the servomotor. For example, if the set units R of the move command are 0.1 μm/pulse, the traveling distance L of the movable machine element per motor revolution is 8 mm and the number of pulses generated by the pulse coder per servomotor revolution is N pulses/rev, then $$DMR = 80000/N$$

is obtained from the foregoing equation. If the movable machine element is moved 10 mm/rev, then $$DMR = 100{,}000/N$$

is obtained.

The overall operation of FIG. 1 will now be described.

In the DMR arithmetic unit 20, Eq. (1) is used to compute, in advance, the detection multiplier ratio DMR from the traveling distance L of the movable machine element per motor revolution, the set units R of the move command and the pulse number N per revolution of the pulse coder 18.

If the move command $\Delta R_n$ is generated every $\Delta T$ under these conditions, the command is accumulated by the move command accumulator 11, the difference between the accumulated value $P_c$ of the move command and the absolute position (absolute position expressed in the set units) $P_A$ outputted by the DMR multiplying unit 19 is calculated as the position error $E_r$ by the position error arithmetic unit 12. The position error $E_r$ is held in the error holding unit 13. The position error $E_r$ is then multiplied by the position gain $K_p$ to generate a commanded velocity $V_{CMD}$, and velocity and current control are subsequently carried out to rotate the servomotor 17a.

When the servomotor rotates, N-number of incremental pulses are generated per servomotor revolution by the pulse coder 18a (see FIG. 2) of the absolute position detecting pulse coder 18. These pulses are accumulated by the counter 18b, and the value of the count from the counter is output as the absolute position $P_A'$.

The DMR multiplying unit 19 performs an arithmetic operation in accordance with the following equation:

$$P_A = \{L/(R \cdot N)\} \cdot P_A' \qquad (2)$$

to output the absolute position $P_A$ expressed in the set units.

Thereafter, the foregoing processing is repeated every predetermined time $\Delta T$ to rotate the servomotor at the commanded velocity.

Thus, the present invention is such that the absolute position is multiplied by the DMR, not an incremental traveling distance every $\Delta T$ as is done in the prior art. Therefore, even if the detection multiplier ratio DMR has a value following a decimal point, an error will not be accumulated, as occurs in the prior art. This means that it will suffice to prepare only one type of pulse coder.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is no desired to limit the invention to the exact construction and operation illustrated and described, and accordingly all suitable modifications and equivalents may be resorted to as falling within the scope of the invention.

What is claimed is:

1. A servomotor control method for controlling rotation of a servomotor in accordance with a move command using an absolute position-detecting pulse coder having a pulse coder for generating a predetermined number N of incremental pulses per revolution of the servomotor and a counter for reversibly counting the incremental pulses in dependence upon direction of rotation of the servomotor, the rotation of the servomotor rotates a movable machine element, said method comprising the steps of:
   (a) computing in advance a detection multiplier ratio from a machine element travelling distance of the moveable machine element per revolution of the servomotor, a travelling distance per pulse of the move command, and the predetermined number N of the incremental pulses from the pulse coder;
   (b) accumulating move commands to produce an accumulated value;

(c) multiplying an absolute position output by the absolute position-detecting pulse coder by the detection multiplier ratio to produce a modified absolute position;

(d) computing, as a position error, a difference between the accumulated value and the modified absolute position; and (e) inputting the position error to the servomotor, and rotating the servomotor based on the position error.

2. A servomotor control method according to claim 1, wherein the detection multiplier ratio (DMR) is computed in step (a) in accordance with the following equation:

$$DMR = L/(R \cdot N)$$

where L represents the machine element travelling distance and R represents the travelling distance.

3. A servomotor control method according to claim 2, wherein steps (b)–(e) are repeated at a predetermined time interval to control rotation of the servomotor.

4. A method for performing servomotor control in accordance with a move command, said method controls rotation of a servomotor using an absolute position-detecting pulse coder including a pulse coder for generating a predetermined number N of incremental pulses per revolution of the servomotor and pulse counter for counting the incremental pulses generated by the pulse coder in dependence upon direction of the rotation of the servomotor, the rotation of the servomotor rotates a movable machine element, said method comprising the steps of:

(a) computing a detection multiplier ratio based on a machine element travelling distance of the movable machine element per revolution of the servomotor, a travelling distance per pulse of the move command and the predetermined number N;

(b) accumulating move commands to produce an accumulated command value;

(c) producing a scaled absolute position by multiplying an absolute position produced by the absolute position-detecting pulse coder by the detection multiplier ratio;

(d) computing a position error by subtracting the scaled absolute position from the accumulated command value; and (e) inputting the position error to the servomotor, and rotating the servomotor based on the position error.

5. A method according to claim 4, wherein step (c) scales the absolute position generated by the absolute position-detecting pulse coder to produce the scaled absolute position having the same units as the move command.

6. A method according to claim 5, wherein said method further comprises step (f) repeating steps (b)–(e) after a predetermined time interval.

7. A servomotor control system for controlling rotation of a servomotor rotating a movable machine element in accordance with a move command, said system comprising:

absolute position-detecting pulse coder means for producing an absolute position of the servomotor, said absolute position-detecting pulse coder means including:

pulse coder means for generating a predetermined number N of incremental pulses per revolution of the servomotor; and pulse counter means for counting the incremental pulses generated by the pulse coder means in dependence upon direction of the rotation of the servomotor;

first arithmetic means for computing a detection multiplier ratio based on a machine element travelling distance of the movable machine element per revolution of the servomotor, a travelling distance per pulse of the move command and the predetermined number N;

accumulation means for accumulating move commands to produce an accumulated command value;

multiplication means for producing a scaled absolute position by multiplying the absolute position produced by the absolute position-detecting pulse coder means by the detection multiplier ratio; and second arithmetic means for computing a position error signal based on a difference between the scaled absolute position and the accumulated command value.

8. A system according to claim 7, wherein said multiplication means scales the absolute position generated by said absolute position-detecting pulse coder means to produce the scaled absolute position having the same units as the move command.

9. A system according to claim 7, wherein said pulse counter means comprises:

a first counter for counting the incremental pulses generated by the pulse coder means; and a second counter, operatively connected to said first counter, for counting a number of rotations of the servomotor.

10. A system according to claim 9, wherein said absolute position-detecting pulse coder means outputs the absolute position of the servomotor even if power is removed from said servomotor control system.

* * * * *

UNITED STATES PATENT AND TRADEMARK OFFICE
CERTIFICATE OF CORRECTION

PATENT NO. : 5,231,340
DATED : July 27, 1993
INVENTOR(S) : Shunsuke MATSUBARA et al.

It is certified that error appears in the above-indentified patent and that said Letters Patent is hereby corrected as shown below:

Column 2, line 61, change "values for" to --views--.

Column 4, line 45, change "no" to --not--.

Signed and Sealed this

Third Day of May, 1994

Attest:

BRUCE LEHMAN

Attesting Officer

Commissioner of Patents and Trademarks